Feb. 13, 1923.

E. B. MEYROWITZ

LENS FOR EYEGLASSES AND SPECTACLES

Filed Dec. 16, 1921

1,445,227

Inventor
Emil B. Meyrowitz
By Stockbridge & Borst
Attorneys

Patented Feb. 13, 1923.

1,445,227

UNITED STATES PATENT OFFICE.

EMIL B. MEYROWITZ, OF NEW YORK, N. Y.

LENS FOR EYEGLASSES AND SPECTACLES.

Application filed December 16, 1921. Serial No. 522,780.

*To all whom it may concern:*

Be it known that I, EMIL B. MEYROWITZ, a citizen of the United States, residing at New York, in the county of New York and State of New York, have invented certain new and useful Improvements in Lenses for Eyeglasses and Spectacles, of which the following is a full, clear and exact description.

My invention relates to optical lenses for use in eyeglasses and spectacles, the same being designed as an improvement upon the well known Kryptok bifocal lens.

The object of the invention is to provide a lens with distinct distance and near-vision fields and in which variable degrees of power may be obtained in different parts of the near-vision field.

In the preferred form of my invention the near-vision field of the lens gradually increases in power from its line of junction with the distance field, and the lens is produced by fusing a piece of glass of a certain index of refraction into a recess in a piece of glass of lower index of refraction, the surface of the recess being generated upon a curve of gradually decreasing strength from its apex outwardly, and the blank thus formed being afterwards ground with even surfaces on both sides to produce the finished lens.

The details of my invention will hereinafter appear and that which I regard as new will be set forth in the claims.

In the drawings forming part of this specification,

Figure 1:
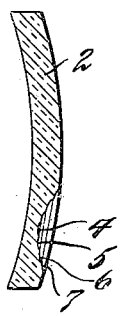
Figure 1 is a sectional view of a block of glass showing the partially formed recess therein.
Figure 2:
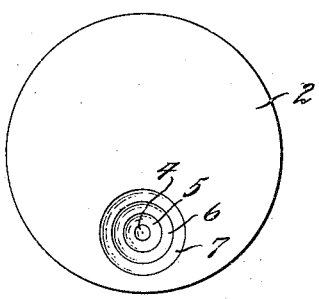
Figure 2 is a face view of the same.
Figure 3:
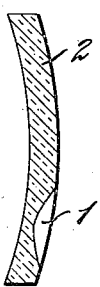
Figures 3 and 4 are sectional and face views respectively of the block, showing the recess completed.
Figure 4:
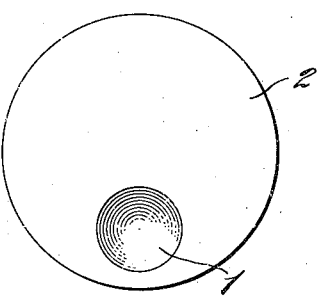
Figure 5:
Figure 5 is a sectional view of the button to be fused into the recess.

My improved lens has a distance field of uniform power and a near-vision field of varying power, so that the distance field or major portion of the lens is unifocal and the near-vision field or minor portion of the lens is multifocal.

One practical method of making such a lens is to form a recess or depression 1 in a block or slab 2 of glass, and afterwards fuse into said recess a smaller piece of glass 3, producing what is known as a lens blank. The block 2 and the small piece or button 3 are of glass having different indices of refraction, the block 2 being preferably made of what is known in the trade as crown glass, and the button 3 being made of what is known as flint glass, the latter having a higher index of refraction than crown glass. The block 2 may be circular, square or other suitable shape or contour, and may be flat or concavo-convex, depending upon whether or not a flat or meniscus lens is to be produced. The two sides of the block 2 are, for convenience, made parallel, although this is not essential. The recess 1 in the block 2 has its surface generated upon a curve of gradually decreasing strength from its apex outwardly. Such a surface is difficult of production by the usual grinding and polishing methods, and while the recess may be molded, the molding method cannot be regarded as satisfactory. I propose to produce it by grinding in the block 2, on different radii, but upon the same axial line, a plurality or series of concave spherical surfaces in close proximity to each other, and afterwards removing the lines of division between the adjoining surfaces. In the drawing I have illustrated four of such spherical surfaces as component parts of the surface of the recess 1. The central spherical surface 4, or rather that which is located at the apex of the recess 1, is the strongest curve,—that is, it is struck on an arc having the shortest radius; the spherical surface 5, surrounding and intersecting the surface 4, is upon a weaker curve; the surface 6 which surrounds and intersects the surface 5 is upon a still weaker curve, and the surface 7 which surrounds and intersects the surface 6 is upon a curve weaker than that of the surface 6. The surfaces 4, 5, 6 and 7 are ground successively into the block 2 and when they have been completed they are separated from each other by circular lines or rings, due to the differences in their respective curvatures. The difference in the curvatures of any two adjacent surfaces is very slight, however, and the rings or lines of separation between the surfaces are not sharp or abrupt in any sense. These rings or lines are completely removed during the process of polishing the recess 1, and all of the different spherical surfaces are caused to merge into each other and produce a single concave surface which has a gradually decreasing strength from the apex of the recess toward the edges or circumference thereof.

Figure 6:
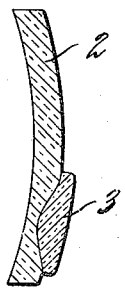
Figure 6 is a similar view of the completed lens blank.
Figure 7:
Figure 7 is a similar view of the finished lens.
Figure 8:
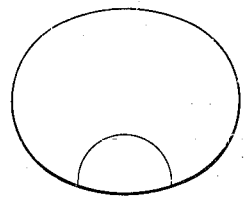
Figure 8 is a face view of the finished lens cut to eye size.

The flint glass of which the button 3 is made has a higher index of refraction and a lower fusing point than the crown glass of which the block 2 is made. Due to its lower fusing point, the flint glass of the button 3 will, during the fusing operation, begin to soften and break down before the crown glass of the block 2. The recess 1 in the block 2 thus serves as a mold for the flint glass button which is introduced into and fused in it. For this reason it is not necessary that the same variable curve be imparted to the convex surface of the button 3 as is formed in the recess 1. It is sufficient in practice to form on the button 3 a surface approximating in curvature that of the recess 1. Any difference in the curvature of the convex surface of the button 3 from that of the concave surface of the recess 1 will be compensated for during the fusing operation when the material of the button softens up, breaks down and conforms to the shape of the recess. The fusing operation may be performed in the manner which is well known in the production of Kryptok fused bifocal lenses. When it is completed, a blank is produced, such as shown in figure 6, which may have its surfaces ground and polished to prescription for the production of the finished lens, as shown in figure 7. Before mounting the same in eyeglasses or spectacles, the lens is cut to the proper shape and size and the edges ground, as shown in figure 8. In cutting to eye size the lower edge of the lens is preferably located just below the center or apex of the near distance field. The finished lens thus has a unifocal distance field of large area and a multifocal near-vision field of small area, the near-vision field being of varying power which gradually increases in strength from its line of juncture with the distance field. The maximum power for reading purposes may be obtained by the user by looking through the near-vision field near the lower edge thereof, and gradually decreasing power for reading may be obtained by raising the eyes slightly from that point.

It is possible to produce a satisfactory lens by fusing the button 3 into the recess in the block 2 without removing the rings or lines of division between the different spherical surfaces 4, 5, 6 and 7 therein. Certain it is that no appreciable aberration will occur if these rings or lines are not completely removed, as I prefer that they should be. The flint glass of the button 3 will conform to any slight irregularities in the surface of the recess which may be due to the incomplete removal of the rings, and the effect of such irregularities will be very materially minimized.

I claim:

1. A lens for eyeglasses and spectacles having a distance field of uniform power and a near-vision field of gradually increasing power from its line of juncture with the distance field.

2. A lens for eyeglasses and spectacles having even surfaces and having a distance field of uniform power and near-vision field of varying power which gradually increases in strength from its line of juncture with the distance field.

3. A lens for eyeglasses and spectacles made from two pieces of glass of different sizes and indices of refraction, the larger of said pieces having a recess therein formed upon a curve of gradually decreasing strength from its apex outwardly, and the smaller of said pieces fitting and secured in said recess.

4. A lens for eyeglasses and spectacles having even surfaces, the same being made from two pieces of glass of different sizes and indices of refraction, the smaller of said pieces, of higher index of refraction, being fused into a recess in the larger piece, which recess is formed upon a curve of gradually decreasing strength from its apex outwardly.

In witness whereof, I hereunto subscribe my signature.

EMIL B. MEYROWITZ.